United States Patent
Ahmavaara

(10) Patent No.: US 9,084,147 B2
(45) Date of Patent: Jul. 14, 2015

(54) PARALLEL REGISTRATION TO OFFLOAD PLMN WITH SINGLE SIM

(71) Applicant: QUALCOMM Incorporated, San Diego, CA (US)

(72) Inventor: Kalle Ilmari Ahmavaara, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/074,534

(22) Filed: Nov. 7, 2013

(65) Prior Publication Data

US 2014/0334297 A1   Nov. 13, 2014

Related U.S. Application Data

(60) Provisional application No. 61/821,146, filed on May 8, 2013.

(51) Int. Cl.
```
H04L 12/28    (2006.01)
H04W 4/00     (2009.01)
H04W 36/00    (2009.01)
H04W 28/08    (2009.01)
H04W 36/14    (2009.01)
H04W 76/02    (2009.01)
```

(52) U.S. Cl.
CPC ............ *H04W 28/08* (2013.01); *H04W 36/14* (2013.01); *H04W 76/025* (2013.01)

(58) Field of Classification Search
CPC ..... H04W 88/06; H04W 12/06; H04W 12/08; H04W 36/0066; H04W 48/18; H04W 60/005; H04W 8/04; H04W 8/065; H04W 8/12; H04W 28/0263; H04W 28/18; H04W 36/0027; H04W 84/045; H04W 76/025; H04L 63/105; H04L 9/0844
USPC ............... 370/331, 230, 254; 455/411, 432.1, 455/436, 435.2
See application file for complete search history.

(56) References Cited

U.S. PATENT DOCUMENTS 8,406,741 B2    3/2013 Kang et al.
8,787,314 B2 *  7/2014 Wu ................................ 370/331
(Continued)

FOREIGN PATENT DOCUMENTS

CN          102137459 A    7/2011
EP          2475217 A1     7/2012
(Continued)

OTHER PUBLICATIONS

International Search Report and Written Opinion—PCT/US2014/036662—ISA/EPO—Sep. 2, 2014.
(Continued)

*Primary Examiner* — Alpus H Hsu
*Assistant Examiner* — Elston Williams
(74) *Attorney, Agent, or Firm* — Arent Fox LLP

(57) ABSTRACT

A method, an apparatus, and a computer program product for wireless communication are provided. The apparatus establishes a first cellular communication link with a first cellular network based on a subscriber identifier, establishes a second cellular communication link with a second cellular network based on the subscriber identifier, and maintains the first cellular communication link concurrently with the second cellular communication link.

46 Claims, 14 Drawing Sheets

(56) References Cited

U.S. PATENT DOCUMENTS

| | | |
|---|---|---|
| 8,817,600 B2* | 8/2014 | Payyappilly et al. ......... 370/225 |
| 2008/0008157 A1 | 1/2008 | Edge et al. |
| 2008/0259912 A1* | 10/2008 | Wang et al. ................... 370/356 |
| 2008/0304441 A1* | 12/2008 | Tsirtsis et al. ................ 370/328 |
| 2009/0238099 A1* | 9/2009 | Ahmavaara .................... 370/254 |
| 2010/0080172 A1* | 4/2010 | Jin et al. ........................ 370/328 |
| 2010/0142373 A1* | 6/2010 | Jin et al. ........................ 370/230 |
| 2010/0197272 A1 | 8/2010 | Karaoguz et al. |
| 2011/0246777 A1* | 10/2011 | Buckley et al. ............... 713/172 |
| 2012/0071163 A1* | 3/2012 | Klingenbrunn et al. ... 455/435.2 |
| 2012/0182938 A1* | 7/2012 | Mujtaba et al. ............... 370/328 |
| 2012/0264402 A1* | 10/2012 | Zhang et al. ................... 455/411 |
| 2012/0282915 A1 | 11/2012 | Haynes et al. |
| 2013/0016601 A1 | 1/2013 | Patil et al. |
| 2014/0192780 A1* | 7/2014 | Kim et al. ...................... 370/331 |

FOREIGN PATENT DOCUMENTS

| | | |
|---|---|---|
| EP | 2621216 A1 | 7/2013 |
| WO | 2010094319 A1 | 8/2010 |
| WO | 2011150770 A1 | 12/2011 |
| WO | 2012140654 A1 | 10/2012 |

OTHER PUBLICATIONS

Second Written Opinion from International Application No. PCT/US2014/036662, dated Apr. 16, 2015, 8 pages.

Toshiba Europe Research Laboratories et al., "Scenarios for simultaneous connectivity and IP flow mobility", 3GPP Draft; S1-084134 Multiple Streams-Requirements, 3rd Generation Partnership Project (3GPP), Mobile Competence Centre; 650, Route Des Lucioles; F-06921 Sophia-Antipolis Cedex; France, No. Miami; 20081111, Nov. 11, 2008, pp. 1-3, XP050330197, [retrieved on Nov. 11, 2008].

* cited by examiner

PARALLEL REGISTRATION TO OFFLOAD PLMN WITH SINGLE SIM

CROSS-REFERENCE TO RELATED APPLICATION(S)

This application claims the benefit of U.S. Provisional Application Ser. No. 61/821,146, entitled "PARALLEL REGISTRATION TO OFFLOAD PLMN WITH SINGLE SIM" and filed on May 8, 2013, which is expressly incorporated by reference herein in its entirety.

BACKGROUND

1. Field

The present disclosure relates generally to communication systems, and more particularly, to parallel registration to offload public land mobile network (PLMN) with a single subscriber identity module (SIM).

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus may be a user equipment (UE). The apparatus establishes a first cellular communication link with a first cellular network based on a subscriber identifier, establishes a second cellular communication link with a second cellular network based on the subscriber identifier, and maintains the first cellular communication link concurrently with the second cellular communication link.

In an aspect of the disclosure, a method, a computer program product, and an apparatus are provided. The apparatus may be a PLMN. The apparatus receives information associated with a UE that comprises a single subscriber identifier, the UE being in communication with a first cellular network via a first cellular communication link, establishes a second cellular communication link with the UE for communication with a second cellular network based at least on the received information, and maintains the second cellular communication link while the UE is in communication with the first cellular network via the first cellular communication link.

DETAILED DESCRIPTION

Figure 1:
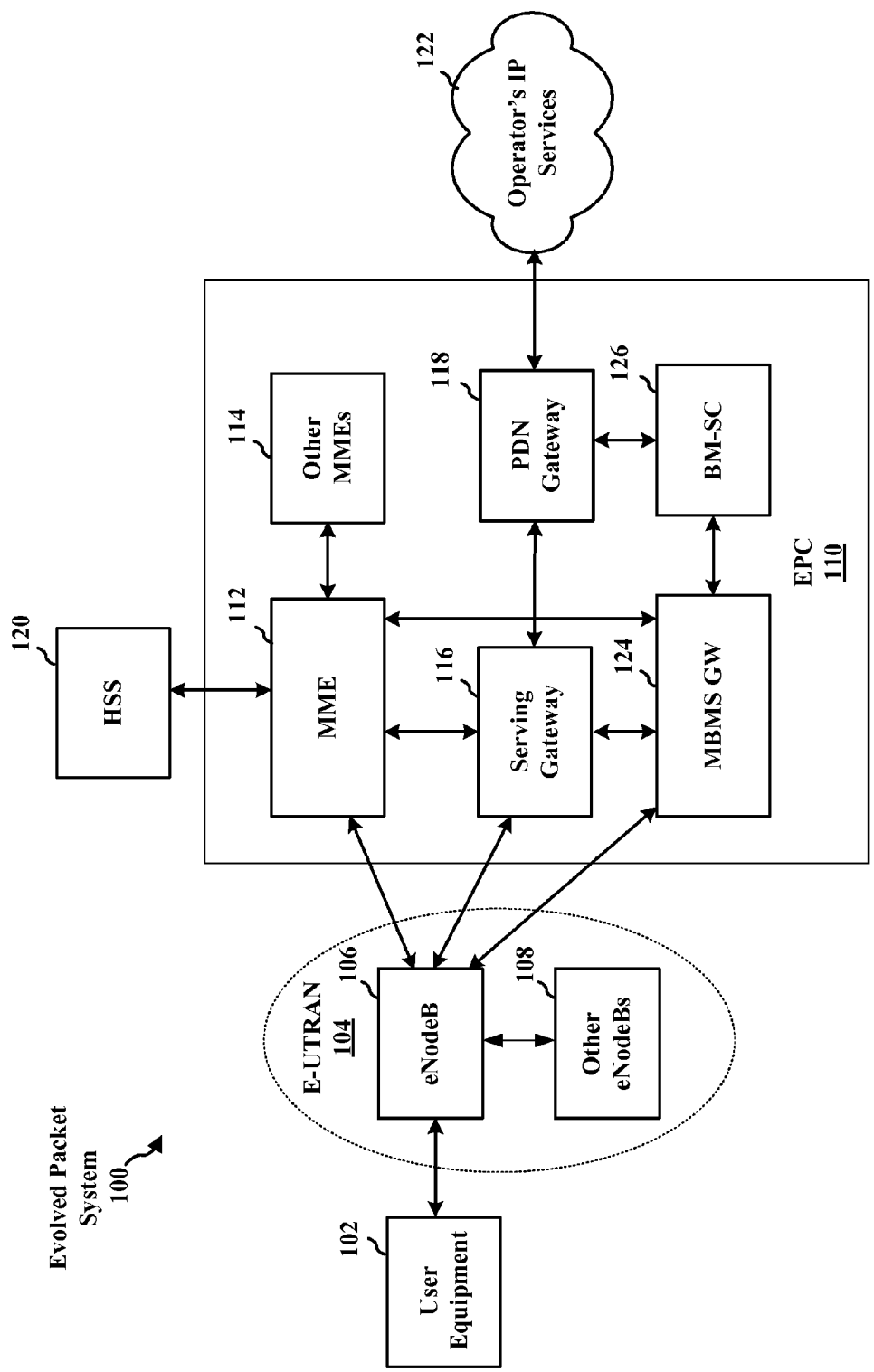
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102.

Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 includes a Mobility Management Entity (MME) 112, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS). The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
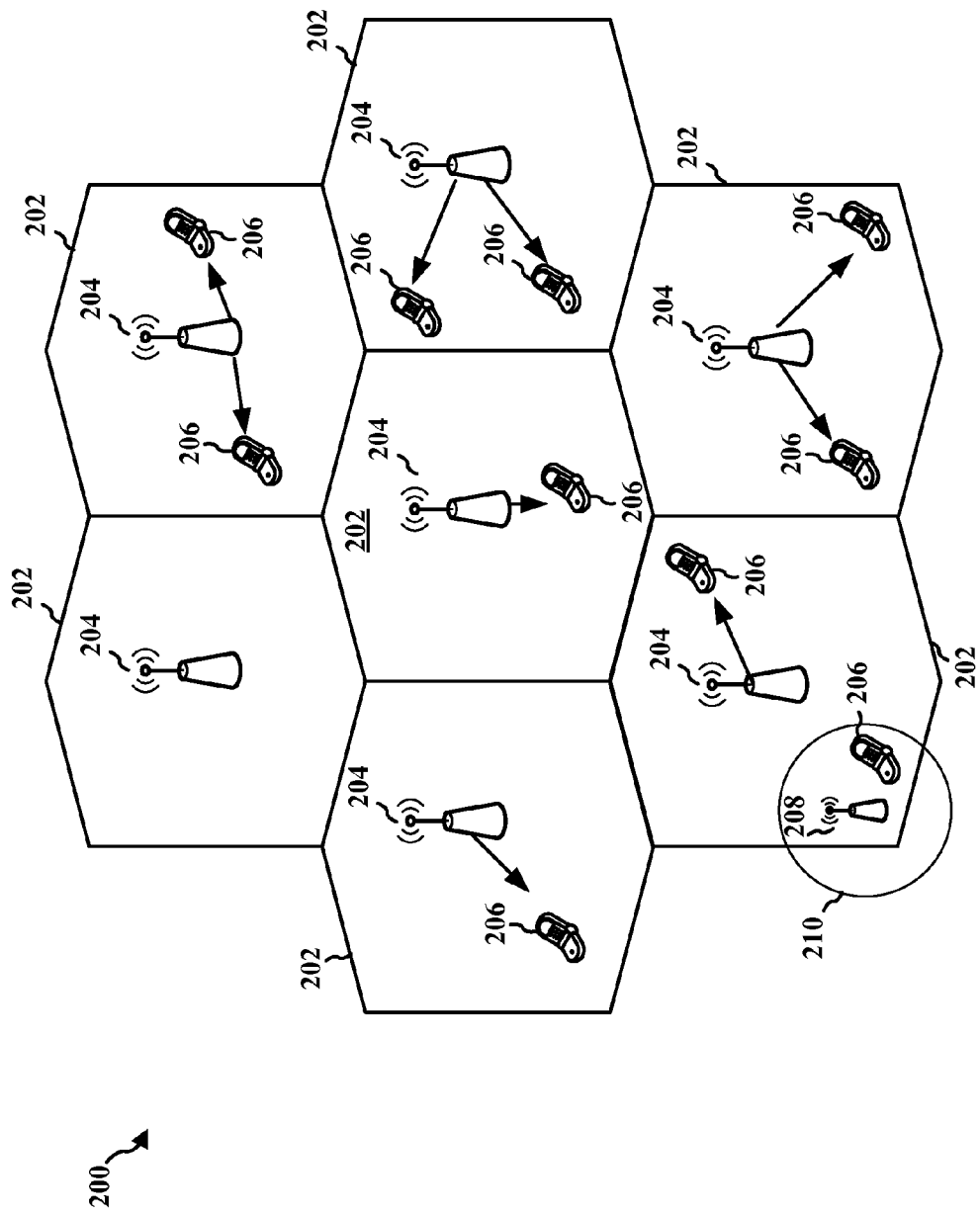
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sector). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
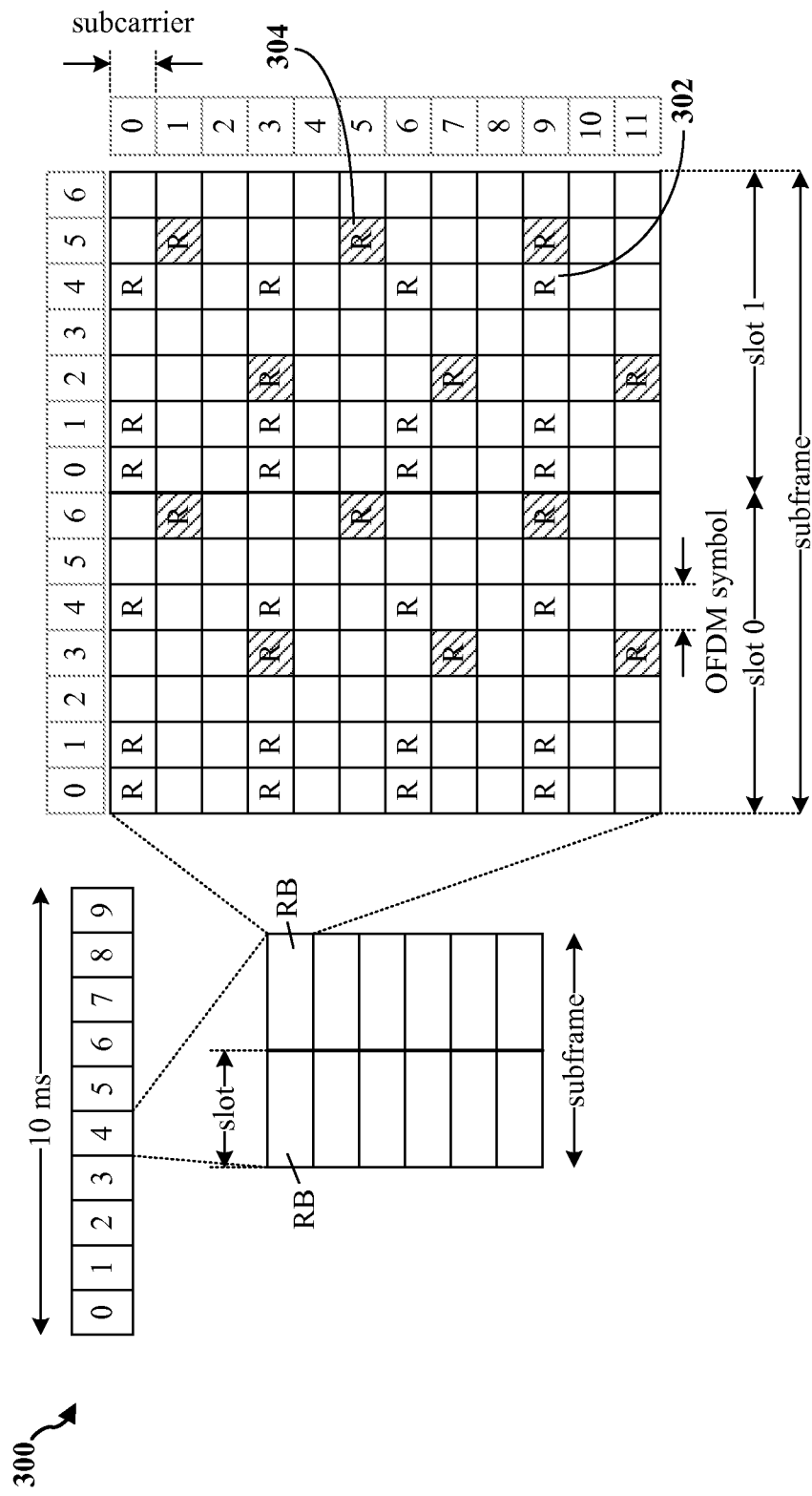
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements.

In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
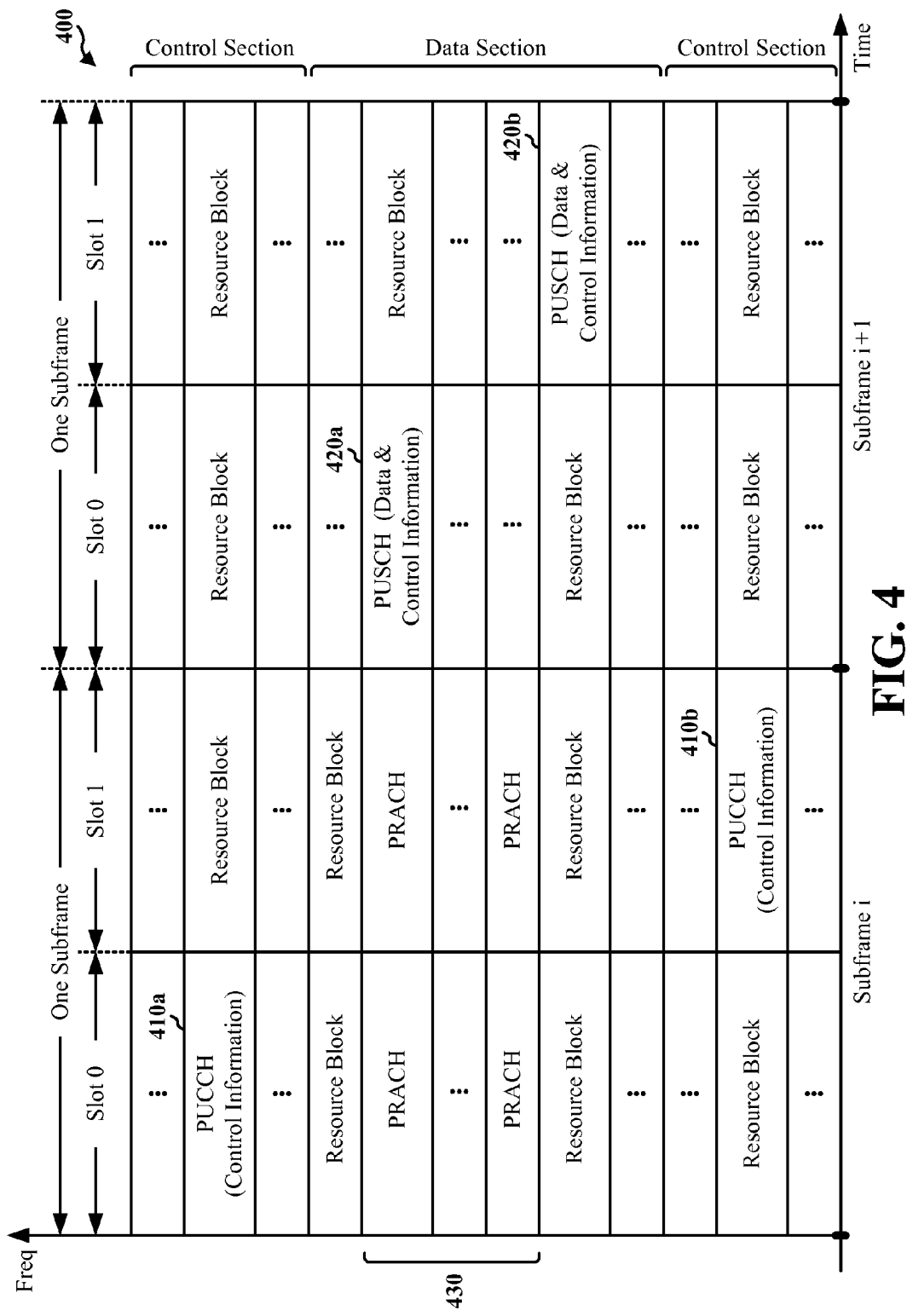
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
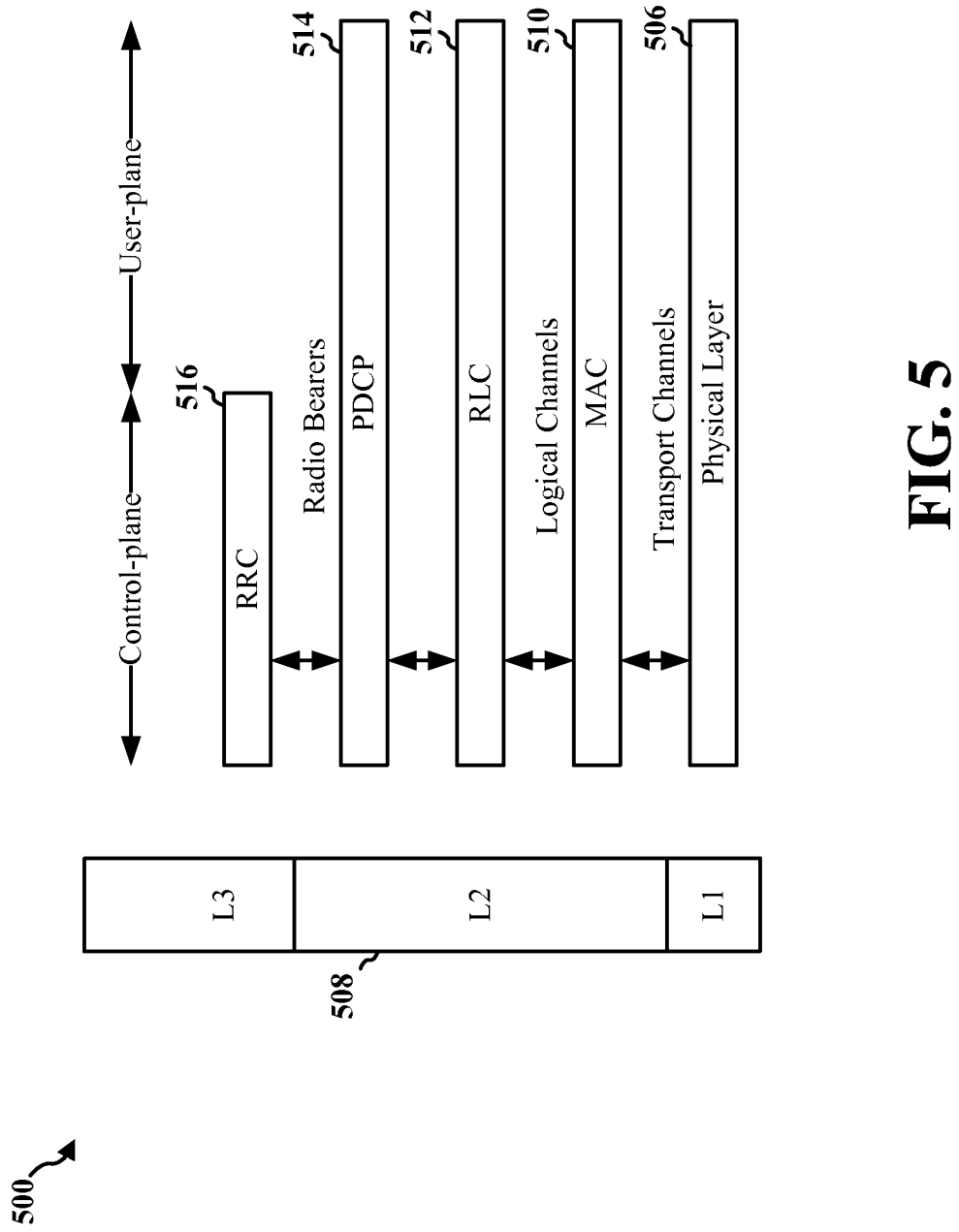
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
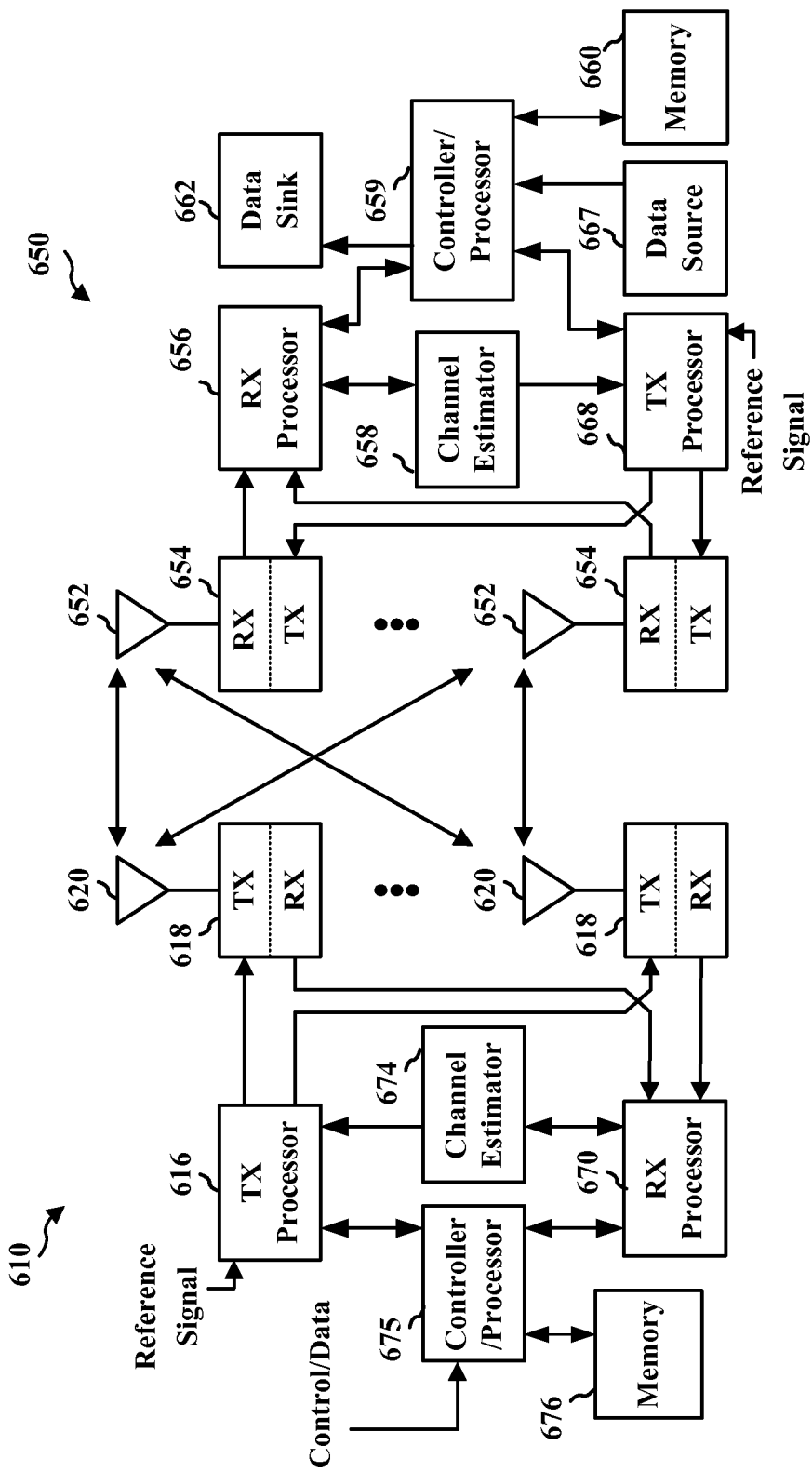
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

As demand for mobile data continues to increase, local area networks (e.g., WiFi™) are being increasingly used to offload data traffic from wide area networks (WANs), such as LTE or W-CDMA networks. Accordingly, for example, based on the 3GPP WiFi™ interworking architecture and/or Hotspot 2.0 specifications, solutions where a WiFi™ connection is established using a mobile network operator (MNO) SIM are being increasingly implemented. As used herein, the term "MNO" may also be referred to as a wireless service provider, a wireless carrier, a cellular company, or a mobile network carrier. For example, when a UE (also referred to as an "MNO device") that is in communication with an MNO WAN connects to a WiFi™ network, the MNO WAN connection is maintained and serves both as a fallback data connection (e.g., in circumstances where WiFi™ is no longer available) and/or as the connection for receiving voice and other MNO services independently of the WiFi™ network.

Typically, small cells (e.g., femtocells, picocells, microcells) are deployed by MNOs and are considered to be extensions of the MNO WAN. The small cells deployed by an MNO may perform a handover between a small cell of the MNO and a macro cell of the MNO, similar to a handover between two macrocells of an MNO. Small cells may be deployed by entities other than MNOs, such as cable television companies, as independent small cell networks. Such independent small cell networks may provide opportunistic low cost offload data services to UEs in a manner similar to the offload data services provided by WiFi™ networks. For example, a UE in communication with an MNO WAN (e.g., an LTE network) may be able to offload data services by concurrently communicating with a WiFi™ network.

A reduction in costs may be achieved via unplanned deployments of small cells by entities other than MNOs and by reusing the existing backhaul and sites (e.g. residential) of such entities. These small cells would not be considered as extensions of MNO macro networks, but independent opportunistically available offload networks. Moreover, these small cells would not replace a main MNO WAN (e.g., an LTE network) connection. For example, based on wholesale roaming agreements between MNOs and cable television entities, UEs would opportunistically connect to small cells deployed by cable television entities and, when connected, the UEs would route most data traffic via the small cells instead of the MNO WAN network. Therefore, in this example, the small cells deployed by the cable television entities would serve as a low cost offload network. In one configuration, the UEs may connect and disconnect to such offload networks without influencing the MNO WAN connection. In such a configuration, for example, the radio connection between a UE and a small cell and the radio connection between the UE and the MNO WAN may coexist.

Figure 7:
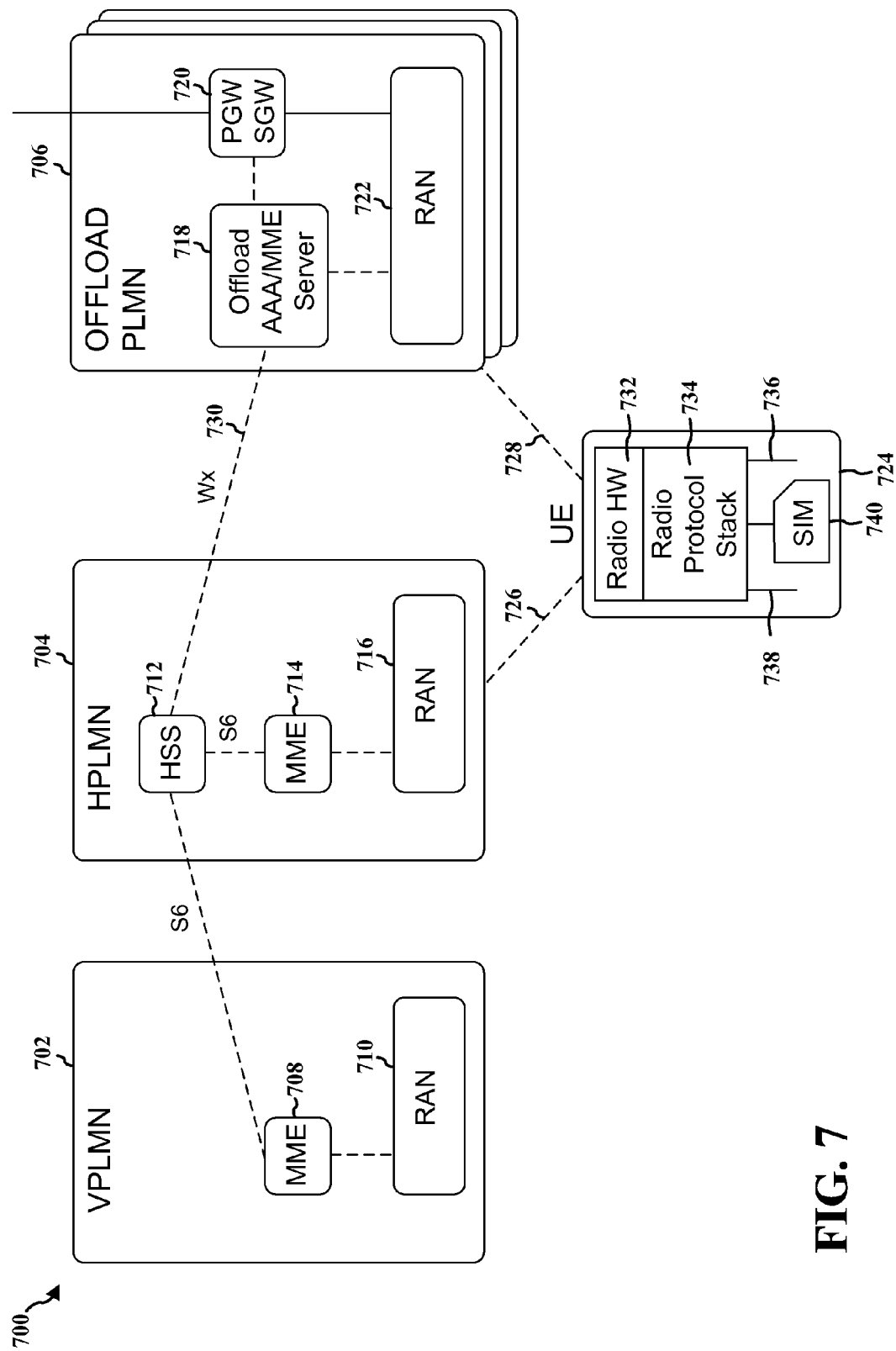
FIG. 7 is a diagram illustrating a wireless communication system.

FIG. 7 is a diagram illustrating a wireless communication system 700. The wireless communication system 700 includes a visited public land mobile network (VPLMN) 702, a home public land mobile network (HPLMN) 704, an offload public land mobile network (OPLMN) 706, and a UE 724. In an aspect, the HPLMN 704 may be a WAN (e.g., a 3GPP LTE network or a W-CDMA network) deployed by a first MNO, the VPLMN 702 may be a WAN (e.g., a 3GPP LTE network or a W-CDMA network) deployed by a second MNO that is different from the first MNO, and the OPLMN 706 may be a collection of small cells based on WAN technologies (e.g., a 3GPP LTE network or a W-CDMA network) deployed by an entity other than an MNO, such as a cable television company.

As shown in FIG. 7, the HPLMN 704 includes a home subscriber server (HSS) 712, an MME 714, and a radio access network (RAN) 716. The VPLMN 702 includes an MME 708 and a RAN 710. The OPLMN 706 includes an offload authentication, authorization, and accounting (AAA)/MME server 718, a packet data network gateway (PGW)/serving gateway (SGW) 720, and a RAN 722. As shown in FIG. 7, the UE 724 may include radio hardware 732, radio protocol stack 734, an IP interface 738 for transmission or reception of IP data packets to or from the HPLMN 704, an IP interface 736 for transmission or reception of IP data packets to or from the OPLMN 706, and a SIM card 740. In an aspect, the SIM card 740 includes a subscriber identifier associated with the HPLMN 704. For example, the subscriber identifier may be a 3GPP international mobile subscriber identity (IMSI) associated with the SIM card 740.

As shown in FIG. 7, the HSS 712 may communicate with the MME 708 of the VPLMN 702 via an S6 interface. The HSS 712 may further communicate with the offload AAA/MME server 718 of the OPLMN 706 via interface 730. In some aspects, the interface 730 does not involve the use of an interface conventionally used for communication between two PLMNS, such as an S6 interface. For example, the interface 730 may be a Wx interface used for authentication of users of wireless local area network (WLAN) access when they connect to the WLAN network using a SIM card. In such aspect, the Wx interface typically used in relation to WLAN interworking, may be applied for interworking between the HPLMN 704 and OPLMN 706 in a manner similar to the way the Wx interface is applied for WLAN interworking. In an aspect, the RAN 710, RAN 716, and RAN 722 may each include an eNB that is configured to communicate with the UE 724 using a wireless communication protocol, such as LTE or W-CDMA.

As shown in FIG. 7, the UE 724 may establish a wireless communication link 726 with the HPLMN 704 via the RAN 716. It should be understood that the term "wireless communication link" may also be referred to as a "cellular communication link." For example, the UE 724 may establish the wireless communication link 726 by attaching (also referred to as "registering") to a 3GPP network, connecting to an Internet access point name (APN), establishing a packet data protocol (PDP) context, and establishing a default bearer. In the configuration of FIG. 7, the wireless communication link 726 may be established based on the subscriber identifier of the UE 724. In an aspect, the subscriber identifier of the UE 724 may be associated with the cellular network of the HPLMN 704. The wireless communication link 726 may be configured to support wireless communication between the RAN 716 and the UE 724 based on a 3GPP LTE or W-CDMA wireless communication protocol.

As further shown in FIG. 7, the UE 724 may establish a wireless communication link 728 with the OPLMN 706 via the RAN 722. In an aspect, the offload AAA/MME server 718 may receive authentication information for the UE 724, authorization information for the UE 724, subscriber information for the UE 724, and/or accounting information for the UE 724 from the HSS 712 via the Wx interface 730. The UE 724 may establish the wireless communication link 728 by attaching to a 3GPP network, connecting to an Internet APN, establishing a PDP context, and establishing a default bearer. In the configuration of FIG. 7, the wireless communication link 728 may be established based on the same subscriber identifier of the UE 724. The wireless communication link 728 may be configured to support wireless communication between the RAN 722 and the UE 724 based on a 3GPP LTE or W-CDMA wireless communication protocol.

In an aspect, the HSS 712 is configured to provide information to the offload AAA/MME 718 for enabling the OPLMN 706 to establish the wireless communication link 728 with the UE 724 without disconnecting the UE 724 from the HPLMN 704. Accordingly, the UE 724 may concurrently maintain the wireless communication links 726 and 728 and may concurrently communicate with the HPLMN 704 and the OPLMN 706. In an aspect, the UE 724 may offload data traffic from the HPLMN 704 to the OPLMN 706. For example, the UE 724 may be in communication with the HPLMN 704 via the wireless communication link 726 while the UE 724 communicates data (e.g., transmission and/or reception of IP data packets) with the OPLMN 706 via the wireless communication link 728. It should be understood that the HPLMN 704 continues to function as the serving MNO WAN for the UE 724 after the UE 724 has established the wireless communication link 728 with the OPLMN 706.

In an aspect, the OPLMN 706 is configured to refrain from registering itself as the serving PLMN towards the HPLMN 704 when a UE 724 establishes the wireless communication link to the OPLMN 706. Accordingly, the offload AAA/MME server 718 maintains the wireless communication link state with the UE 724 on its own without relying on any involvement from HPLMN 704 or HSS 712 for the wireless communication link management between itself and the UE 724.

In an aspect, the radio protocol stack 734 of the UE 724 may be configured as a dual radio protocol stack such that the UE 724 maintains a state of the protocol stack 734 with respect to the HPLMN 704 and a state of the protocol stack 734 with respect to the OPLMN 706. Accordingly, the UE 724 may manage a first instance of the radio protocol stack 734 for communication with the HPLMN 704 and a second instance of the radio protocol stack 734 for communication with the OPLMN 706. The UE 724 may transmit or receive a first IP data packet to or from the HPLMN 704 via the IP interface 738 and may transmit or receive a second IP data packet to or from the OPLMN 706 via the IP interface 736. In an aspect, the UE 724 may dynamically select whether to use the IP interface 736 or the IP interface 738 for transmitting an IP data packet. For example, such dynamic selection by the UE 724 may based on at least a characteristic associated with each of IP interfaces 736 and 738, a state of the first and/or second wireless communication links 726, 728, an expected communication quality via the IP interfaces, a policy on network usage and user input. The radio hardware 732 may be a shared radio hardware resource that is configured to support wireless communication concurrently with two different PLMNs (e.g., HPLMN 704 and OPLMN 706).

In an aspect, the UE 724 may maintain a first security context for communication with the HPLMN 704 and may maintain a second security context for communication with the OPLMN 706. For example, the first security context may be maintained within the SIM card 740 of the UE 724 and the second security context may be maintained outside of the SIM card 740.

It should be noted that in FIG. 7, the UE 724 is assumed to be served simultaneously by the HPLMN 704 and the OPLMN 706, but the same principles apply in the case where the UE 724 is served simultaneously between a VPLMN 702 and the OPLMN 706. For example, if the UE 724 moves into an area covered by the VPLMN 702, the UE 724 may establish a wireless communication link (not shown in FIG. 7) with the VPLMN 702. In this example, the HSS 712 may provide information to the MME 708 via the S6 interface for establishing such wireless communication link and may disconnect the wireless communication link 726 after the wireless communication link with the VPLMN 702 is established. In an aspect, the UE 724 may still maintain the wireless communication link 728 concurrently with the wireless communication link established with the VPLMN 702.

Figure 8:
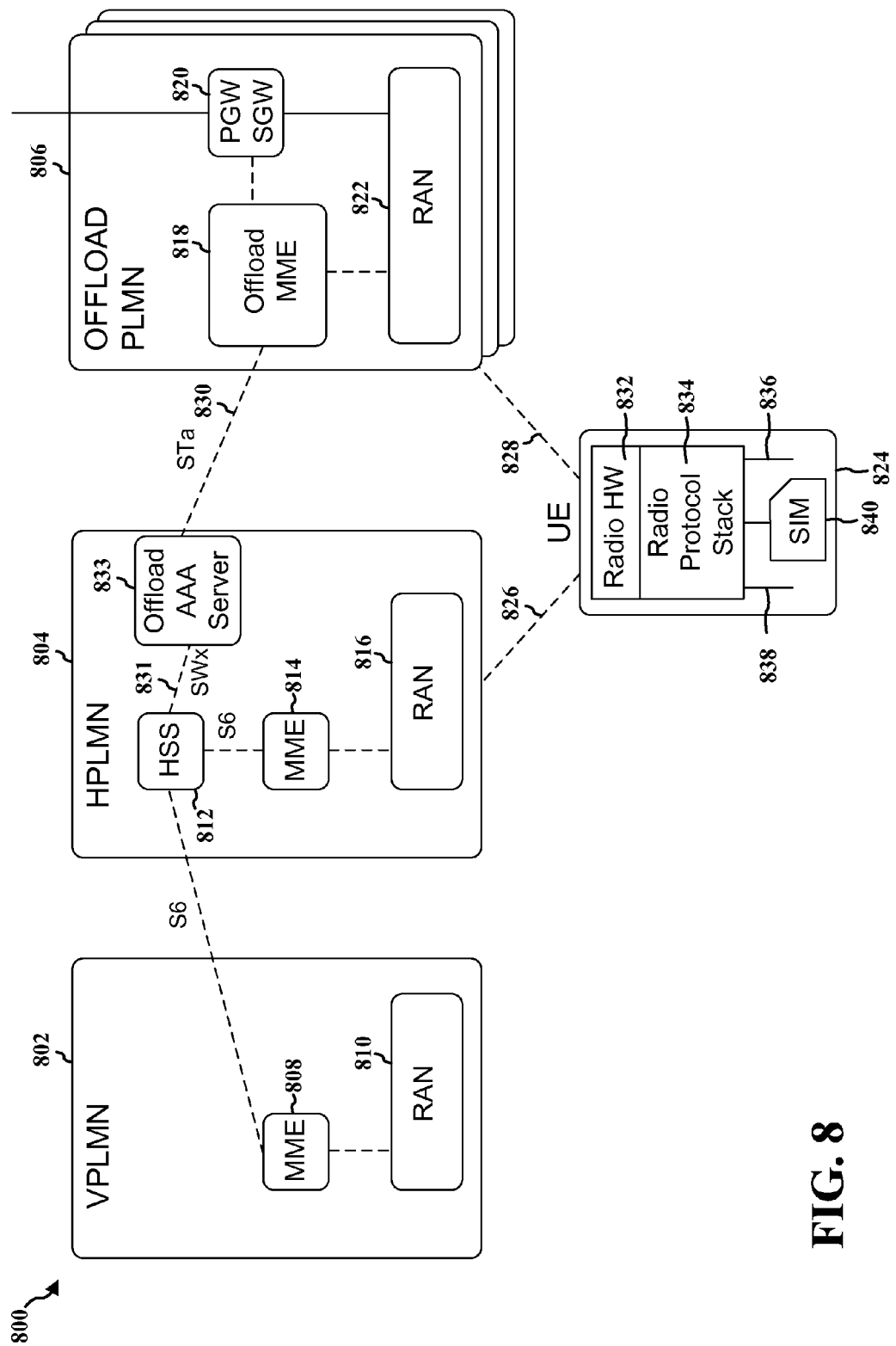
FIG. 8 is a diagram illustrating a wireless communication system.

FIG. 8 is a diagram illustrating a wireless communication system 800. The wireless communication system 800 includes a VPLMN 802, an HPLMN 804, an OPLMN 806, and a UE 824. In an aspect, the HPLMN 804 may be a WAN (e.g., a 3GPP LTE network or a W-CDMA network) deployed by a first MNO, the VPLMN 802 may be a WAN (e.g., a 3GPP LTE network or a W-CDMA network) deployed by a second MNO that is different from the first MNO, and the OPLMN 806 may be a collection of small cells based on WAN technologies (e.g., a 3GPP LTE network or a W-CDMA network) deployed by an entity other than an MNO, such as a cable television company.

As shown in FIG. 8, the HPLMN 804 includes an HSS 812, an MME 814, an offload authentication, authorization, and accounting (AAA) server 833, and a RAN 816. The VPLMN 802 includes an MME 808 and a RAN 810. The OPLMN 806 includes an offload MME 818, a PGW/SGW 820, and a RAN 822. In an aspect, the RAN 810, RAN 816, and RAN 822 may each include an eNB that is configured to communicate with the UE 824 using a wireless communication protocol, such as LTE or W-CDMA.

As shown in FIG. 8, the UE 824 may include radio hardware 832, radio protocol stack 834, an IP interface 838 for transmission or reception of IP data packets to or from the HPLMN 804, an IP interface 836 for transmission or reception of IP data packets to or from the OPLMN 806, and a SIM card 840. In an aspect, the SIM card 840 includes a subscriber identifier associated with the HPLMN 804. For example, the subscriber identifier may be a 3GPP IMSI associated with the SIM card 840.

As shown in FIG. 8, the HSS 812 may communicate with the MME 808 of the VPLMN 802 via an S6 interface. The HSS 812 may further communicate with the offload AAA server 833 via interface 831. In an aspect, the HPLMN 804 may authenticate the UE 824 connecting to the OPLMN 806. Accordingly, the offload AAA server 833 is deployed within the home network and may receive authentication information for the UE 824, authorization information for the UE 824, subscriber information for the UE 824, and/or accounting information for the UE 824 from the HSS 812 via the interface 831. For example, the interface 831 may be a Wx interface, an SWx interface, or any such suitable interface for fetching authentication and authorization information related to the connecting UE 824 from the HSS 812.

In an aspect, the interface 830 between the HPLMN 804 and the OPLMN 806 may be an STa interface, an SWa interface, an SWd interface, or any another such suitable interface that allows execution of authentication between the HPLMN 804 and the UE 824, while the UE 824 is connecting via the OPLMN 806. In an aspect, the interface 830 is also used to fetch and provide authorization and subscriber related information from the HPLMN 804 to the OPLMN 806.

The offload MME 818 is an MME configured specifically for the purposes of the OPLMN 806. Instead of directly interfacing with the HSS 812 of the HPLMN 804, the offload MME 818 is configured to interface with the HPLMN 804 via an AAA based infrastructure. The AAA infrastructure may be the same as is typically used to authenticate and authorize HPLMN devices (e.g., the UE 824) connecting to WiFi™ access systems. As compared to a traditional MME, the offload MME 818 does not retrieve authentication vectors from the HPLMN 804 and, therefore, does not execute the actual device authentication itself. The offload MME 818 instead functions as a pass-through so that the actual authentication can occur between the UE 824 and the offload AAA server 833 of the HPLMN 804. In an aspect, the offload MME 818 may be configured to serve the UE 824 connected to the OPLMN 806 based on a subscriber profile delivered to the offload MME 818 from the HPLMN 804 via the AAA infrastructure. This subscriber profile may be different than the typical subscriber profile utilized by MMEs (e.g., MME 808) at an HPLMN or VPLMNs. In an aspect, the subscriber profile utilized by the offload MME 818 may be the same or similar to the subscriber profile utilized towards WiFi™ networks.

As shown in FIG. 8, the UE 824 may establish a wireless communication link 826 with the HPLMN 804 via the RAN 816. For example, the UE 824 may establish the wireless communication link 826 by attaching to a 3GPP network, connecting to an Internet APN, establishing a PDP context, and establishing a default bearer. In the configuration of FIG. 8, the wireless communication link 826 may be established based on the subscriber identifier of the UE 824. In an aspect, the subscriber identifier of the UE 824 may be associated with the cellular network of the HPLMN 804. The wireless communication link 826 may be configured to support wireless communication between the RAN 816 and the UE 824 based on a 3GPP LTE or W-CDMA wireless communication protocol.

As further shown in FIG. 8, the UE 824 may establish a wireless communication link 828 with the OPLMN 806 via the RAN 822. The UE 824 may establish the wireless communication link 828 by attaching to a 3GPP network, connecting to an Internet APN, establishing a PDP context, and establishing a default bearer. In the configuration of FIG. 8, the wireless communication link 828 may be established based on the same subscriber identifier of the UE 824. The wireless communication link 828 may be configured to support wireless communication between the RAN 822 and the UE 824 based on a 3GPP LTE or W-CDMA wireless communication protocol.

In an aspect, the offload AAA server 833 is configured to provide subscriber profile information associated with the UE 824 to the offload MME 818 for enabling the OPLMN 806 to establish the wireless communication link 828 with the UE 824 without disconnecting the UE 824 from the HPLMN 804. Accordingly, the UE 824 may concurrently maintain the wireless communication links 826 and 828 and may concurrently communicate with the HPLMN 804 and the OPLMN 806. In an aspect, the UE 824 may offload data traffic from the HPLMN 804 to the OPLMN 806. For example, the UE 824 may be in communication with the HPLMN 804 via the wireless communication link 826 while the UE 824 communicates data (e.g., transmission and/or reception of IP data packets) with the OPLMN 806 via the wireless communication link 828. It should be understood that the HPLMN 804 continues to function as the serving MNO WAN for the UE 824 after the UE 824 has established the wireless communication link 828 with the OPLMN 806.

Figure 9:
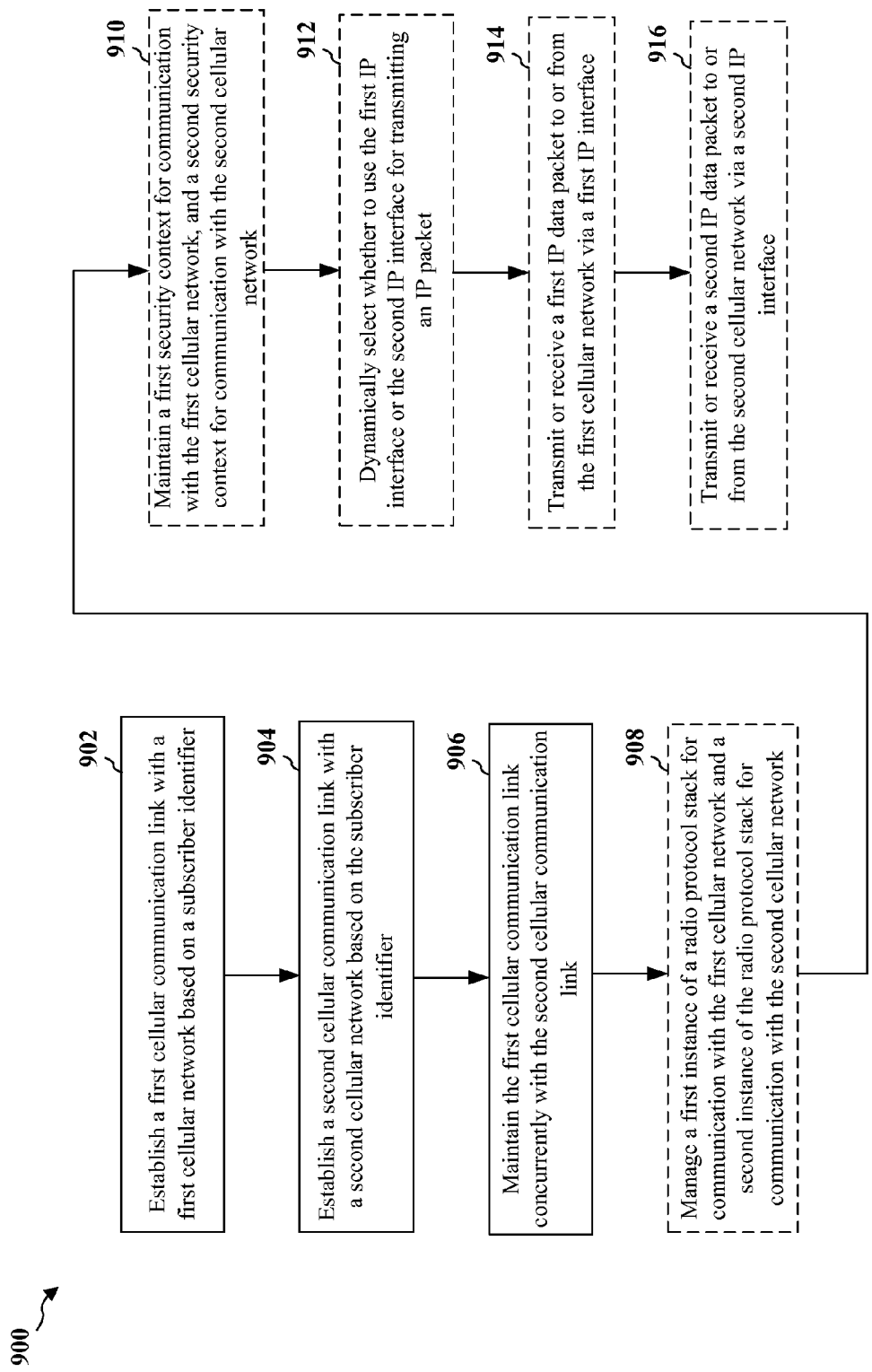
FIG. 9 is a flow chart of a method of wireless communication.

FIG. 9 is a flow chart 900 of a method of wireless communication. The method may be performed by a UE, such as the UE 724 discussed with respect to FIG. 7. At step 902, the UE establishes a first cellular communication link (e.g., cellular communication link 726) with a first cellular network (e.g., HPLMN 704) based on a subscriber identifier. In an aspect, the UE establishes the first cellular communication link by attaching to a 3GPP network, connecting to an Internet APN, establishing a PDP context, and/or establishing a default bearer.

At step 904, the UE establishes a second cellular communication link (e.g., cellular communication link 728) with a second cellular network (e.g., OPLMN 706) based on the same subscriber identifier. In an aspect, the UE establishes the second cellular communication link by attaching to a 3GPP network, connecting to an Internet APN, establishing a PDP context, and/or establishing a default bearer. In an aspect, the subscriber identifier is associated with the first cellular network. For example, the subscriber identifier may be a 3GPP international mobile subscriber identity (IMSI) associated with a SIM card (e.g., SIM card 740) installed in the UE 724.

At step 906, the UE maintains the first cellular communication link concurrently with the second cellular communication link.

At step 908, the UE manages a first instance of a radio protocol stack for communication with the first cellular network and manages a second instance of the radio protocol stack for communication with the second cellular network.

At step 910, the UE maintains a first security context for communication with the first cellular network, and a second security context for communication with the second cellular network. In an aspect, the first security context is maintained within a SIM card (e.g., SIM card 740) and the second security context is maintained outside of the SIM card.

At step 912, the UE dynamically selects whether to use the first IP interface or the second IP interface for transmitting an IP data packet. For example, with reference to FIG. 7, the first IP interface may be the IP interface 736 and the second IP interface may be the IP interface 738. In an aspect, the dynamic selection is based on a characteristic associated with each of the first and second IP interfaces, a state of the first or second cellular communication link, an expected communication quality via the first or second IP interfaces, and/or a policy on network usage and user input.

At step 914, the UE transmits or receives a first IP data packet to or from the first cellular network via a first IP interface. Finally, at step 916, the UE transmits or receives a second IP data packet to or from the second cellular network via a second IP interface.

Figure 10:
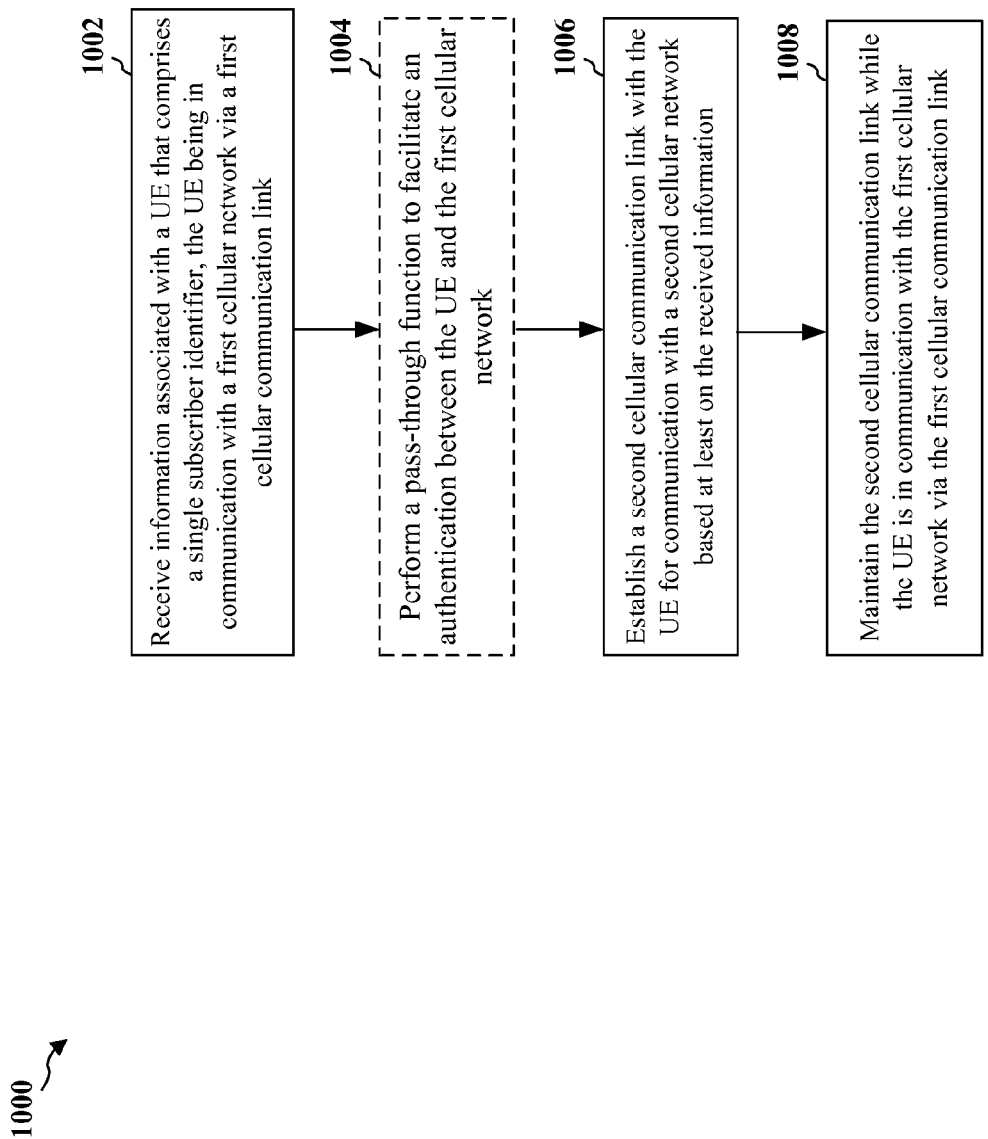
FIG. 10 is a flow chart of a method of wireless communication.

FIG. 10 is a flow chart 1000 of a method of wireless communication. The method may be performed by a PLMN, such as OPLMN 706 discussed with respect to FIG. 7. At step 1002, the PLMN receives information associated with a UE (e.g., UE 724) that comprises a single subscriber identifier, the UE being in communication with a first cellular network (e.g., HPLMN 704) via a first cellular communication link (e.g., cellular communication link 726). In an aspect, the information associated with the UE includes authentication information for the UE, authorization information for the UE, subscriber information for the UE, and/or accounting information for the UE. In an aspect, the information associated with the UE is received from an HSS (e.g., HSS 712) of the first cellular network through a Wx interface. In an aspect, the information associated with the UE is received at an offload AAA/MME server (e.g., offload AAA/MME server 718 in FIG. 7). In an aspect, the subscriber identifier is associated with the first cellular network. For example, the subscriber identifier may be a 3GPP IMSI associated with a SIM card (e.g., SIM card 740) installed in the UE 724.

At step 1004, the PLMN performs a pass-through function so that the actual authentication of the UE can occur between the UE and an offload AAA server (e.g., offload AAA server 833 in FIG. 8). For example, with reference to FIG. 8, the UE 824 may communicate with the offload AAA server 833 of the HPLMN 804 through the offload MME 818 to allow the offload AAA server 833 to perform authentication of the UE 824. In such an example, the MME 818 of the OPLMN 806 may perform the pass-through function.

At step 1006, the PLMN establishes a second cellular communication link (e.g., cellular communication link 728) with the UE for communication between the UE and a second cellular network based at least on the received information. For example, with reference to FIG. 7, the PLMN establishes the second cellular communication link 728 with the UE 724 when the UE 724 is authenticated by the PLMN using the previously received information associated with the UE 724.

Finally, at step 1008, the PLMN maintains the second cellular communication link while the UE is in communication with the first cellular network via the first cellular communication link.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented. It should be understood that the steps indicated by dotted lines (e.g., steps 908, 910, 912, 914, and 916 in FIG. 9 and step 1004 in FIG. 10) represent optional steps.

Figure 11:
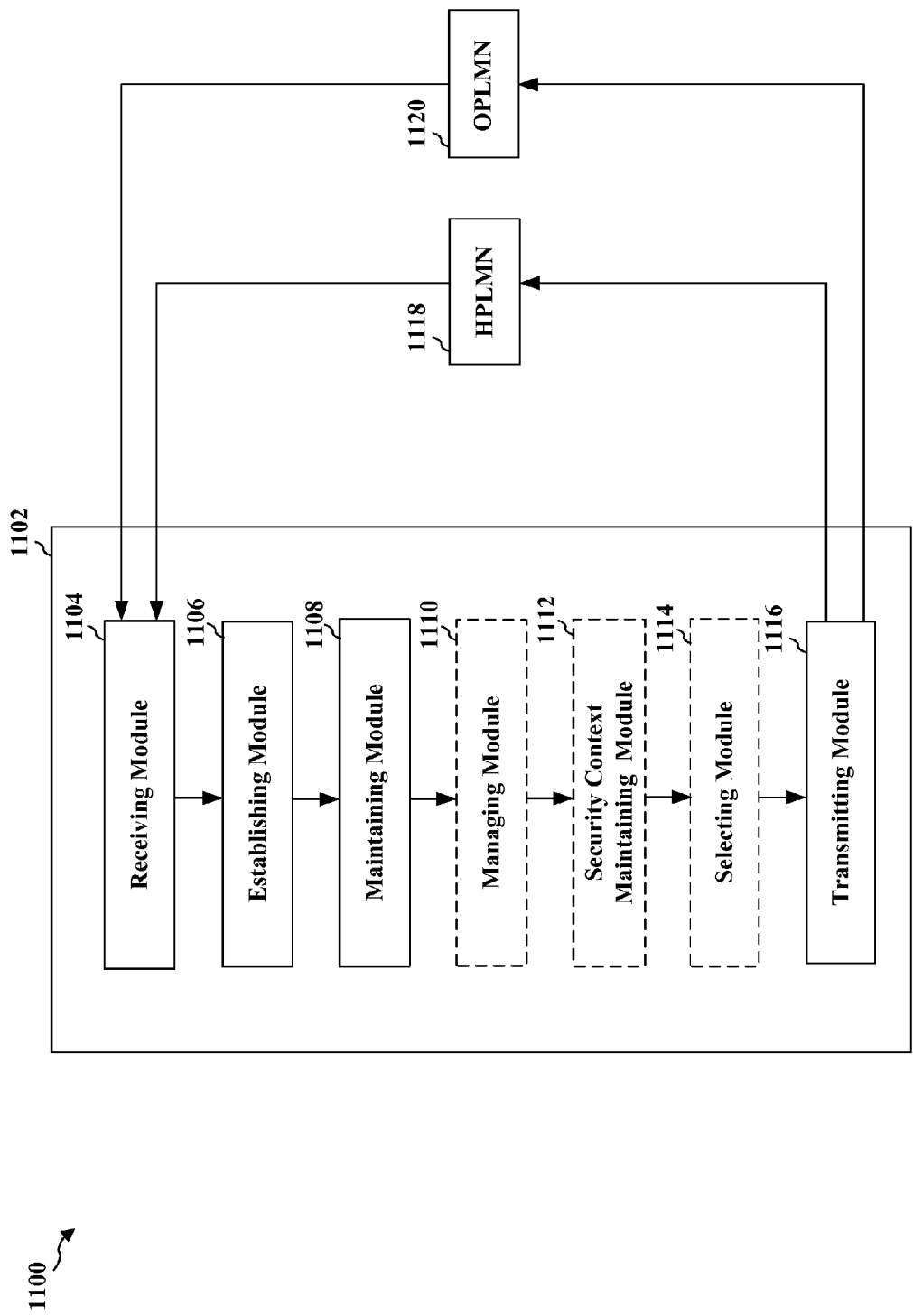
FIG. 11 is a conceptual data flow diagram illustrating the data flow between different modules/means/components in an exemplary apparatus.

FIG. 11 is a conceptual data flow diagram 1100 illustrating the data flow between different modules/means/components in an exemplary apparatus 1102. The apparatus may be a UE. The apparatus includes a module 1104 that receives a first IP packet from the first cellular network (e.g., HPLMN 1118) via a first IP interface and receives a second IP packet from the second cellular network (e.g., OPLMN 1120) via a second IP interface, a module 1106 that establishes a first cellular communication link with the first cellular network based on a subscriber identifier and establishes a second cellular communication link with the second cellular network based on the subscriber identifier, a module 1108 that maintains the first cellular communication link concurrently with the second cellular communication link, a module 1110 that manages a first instance of a radio protocol stack for communication with the first cellular network and a second instance of the radio protocol stack for communication with the second cellular network, a module 1112 maintains a first security context for communication with the first cellular network, and a second security context for communication with the second cellular network, a module 1114 that dynamically selects whether to use the first IP interface or the second IP interface for transmitting an IP packet, and a module 1116 that transmits a first IP packet to the first cellular network via a first IP interface and transmits a second IP packet to the second cellular network via a second IP interface.

The apparatus may include additional modules that perform each of the steps of the algorithm in the aforementioned flow chart of FIG. 9. As such, each step in the aforementioned flow chart of FIG. 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 12:
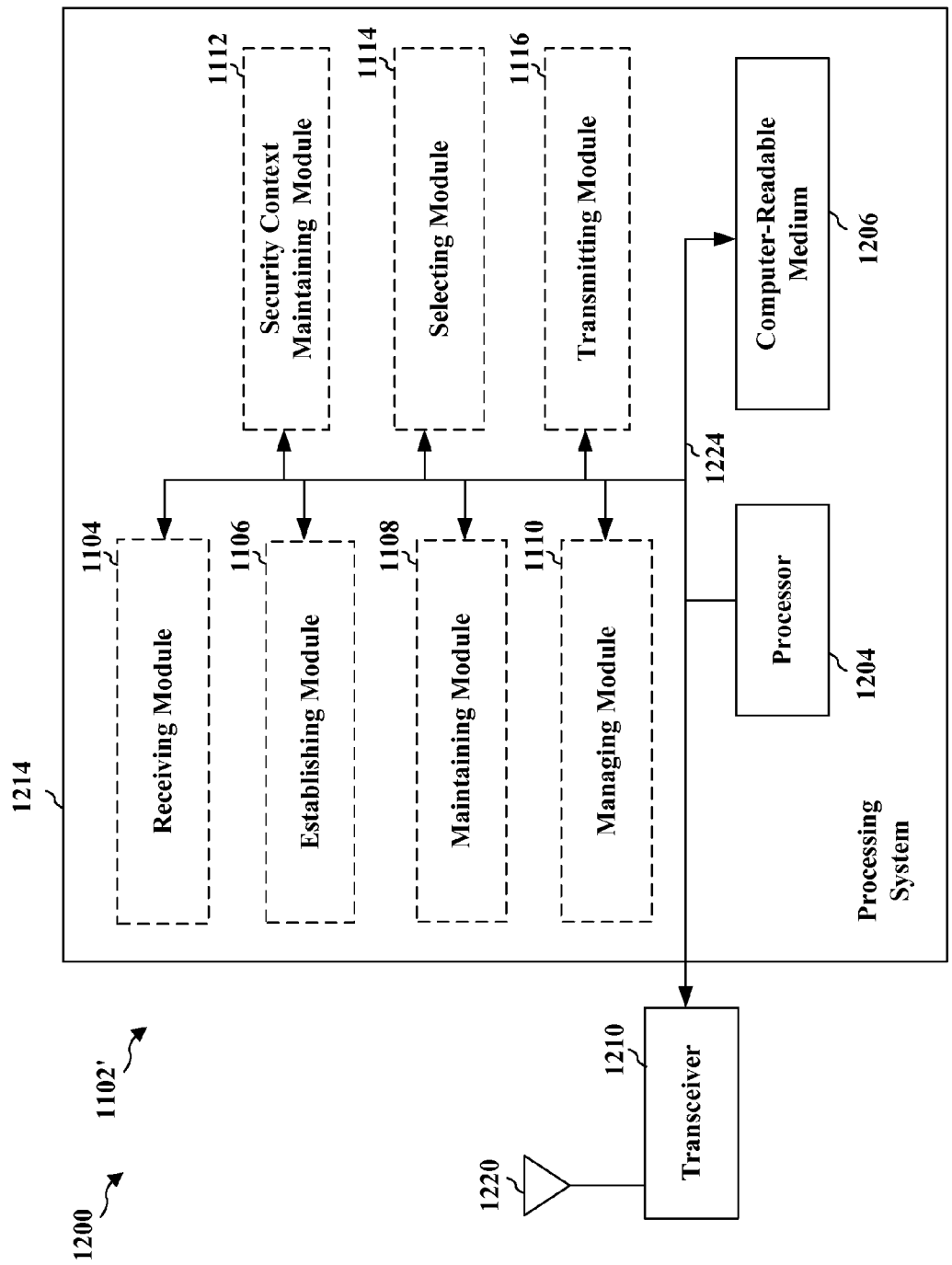
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware modules, represented by the processor 1204, the modules 1104, 1106, 1108, 1110, 1112, 1114, and 1116, and the computer-readable medium 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the receiving module 1104. In addition, the transceiver 1210 receives information from the processing system 1214, specifically the transmission module 1116, and based on the received information, generates a signal to be applied to the one or more antennas 1220. The processing system 1214 includes a processor 1204 coupled to a computer-readable medium 1206. The processor 1204 is responsible for general processing, including the execution of software stored on the computer-readable medium 1206. The software, when executed by the processor 1204, causes the processing system 1214 to perform the various functions described supra for any particular apparatus. The computer-readable medium 1206 may also be used for storing data that is manipulated by the processor 1204 when executing software. The processing system further includes at least one of the modules 1104, 1106, 1108, 1110, 1112, 1114, and 1116. The modules may be software modules running in the processor 1204, resident/stored in the computer readable medium 1206, one or more hardware modules coupled to the processor 1204, or some combination thereof. The processing system 1214 may be a component of the UE 650 and may include the memory 660 and/or at least one of the TX processor 668, the RX processor 656, and the controller/processor 659.

In one configuration, the apparatus 1102/1102' for wireless communication includes means for means for establishing a first cellular communication link with a first cellular network based on a subscriber identifier, means for establishing a second cellular communication link with a second cellular network based on the subscriber identifier, means for maintaining the first cellular communication link concurrently with the second cellular communication link, means for managing a first instance of a radio protocol stack for communication with the first cellular network and a second instance of the radio protocol stack for communication with the second cellular network, means for maintaining a first security context for communication with the first cellular network, and a second security context for communication with the second cellular network, means for transmitting or receiving a first IP packet to or from the first cellular network via a first IP interface, means for transmitting or receiving a second IP packet to or from the second cellular network via a second IP interface, and means for dynamically selecting whether to use the first IP interface or the second IP interface for transmitting an IP packet.

The aforementioned means may be one or more of the aforementioned modules of the apparatus 1102 and/or the processing system 1214 of the apparatus 1102' configured to perform the functions recited by the aforementioned means. As described supra, the processing system 1214 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 13:
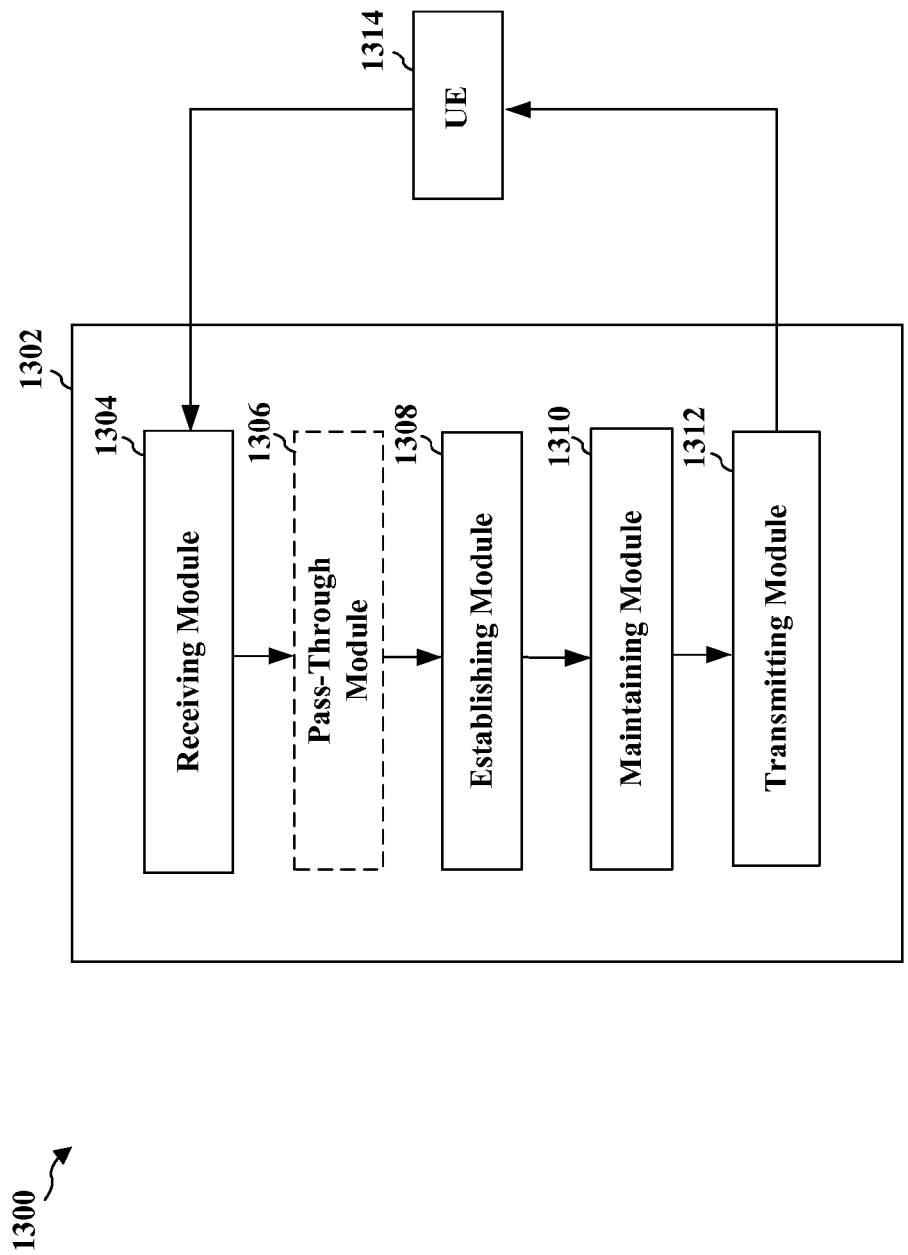
FIG. 13 is a conceptual data flow diagram illustrating the data flow between different modules/means/components in an exemplary apparatus.

FIG. 13 is a conceptual data flow diagram 1300 illustrating the data flow between different modules/means/components in an exemplary apparatus 1302. The apparatus may be an offload PLMN, such as the OPLMN 706. The apparatus includes a module 1304 that receives information associated with a UE (e.g., UE 1314) that comprises a single subscriber identifier, a module 1306 that performs a pass-through function to facilitate an authentication between the UE and the first cellular network, a module 1308 that establishes a second cellular communication link with the UE for communication with a second cellular network based at least on the received information, a module 1310 that maintains the second cellular communication link while the UE is in communication with the a cellular network via the first cellular communication link, and a transmitting module 1312 for sending communications (e.g., IP data packets) to the UE.

The apparatus may include additional modules that perform each of the steps of the algorithm in the aforementioned flow chart of FIG. 10. As such, each step in the aforementioned flow chart of FIG. 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 14:
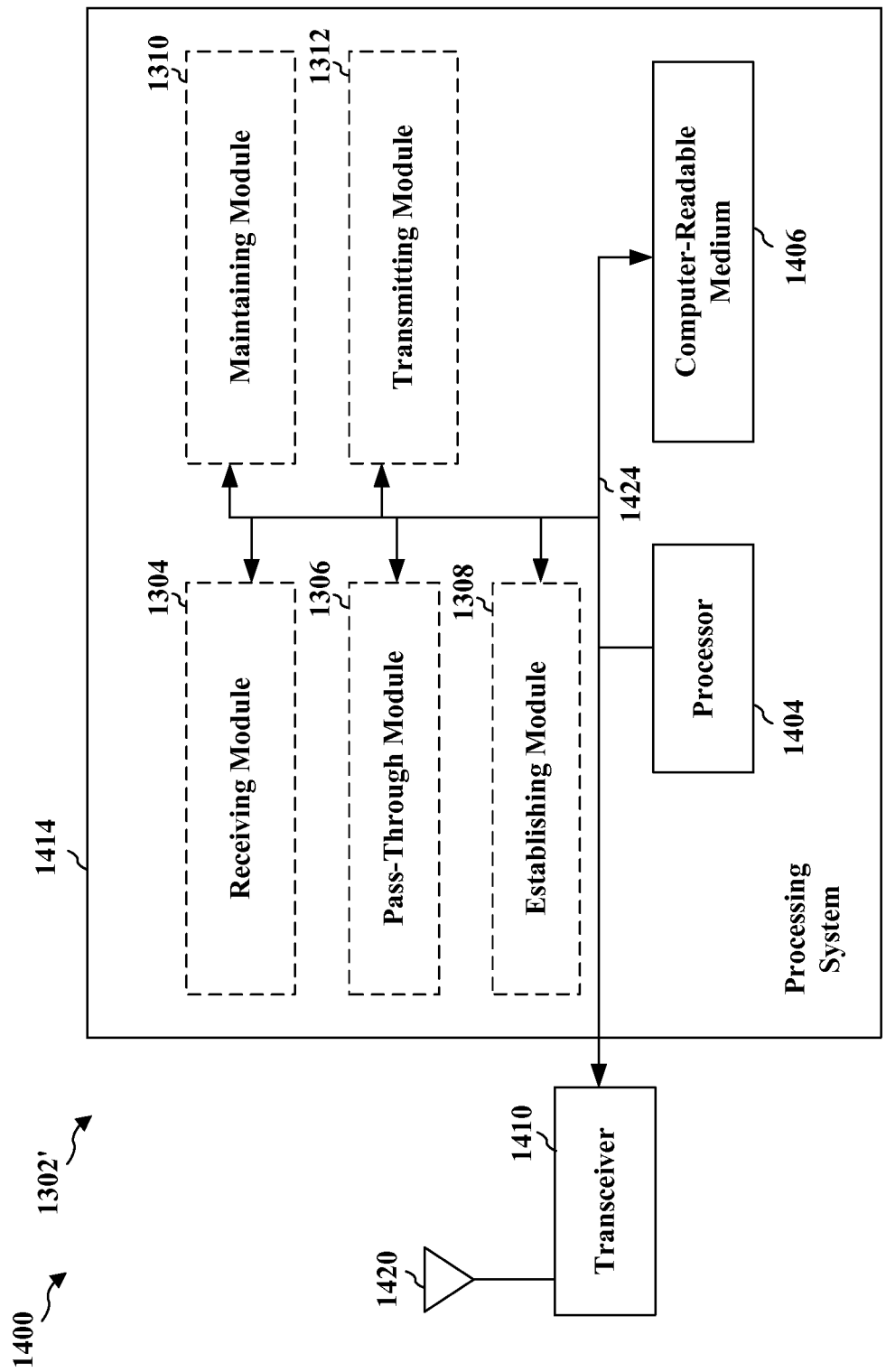
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware modules, represented by the processor 1404, the modules 1304, 1306, 1308, 1310 and 1312 and the computer-readable medium 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the receiving module 1304. In addition, the transceiver 1410 receives information from the processing system 1414, specifically the transmission module 1312, and based on the received information, generates a signal to be applied to the one or more antennas 1420. The processing system 1414 includes a processor 1404 coupled to a computer-readable medium 1406. The processor 1404 is responsible for general processing, including the execution of software stored on the computer-readable medium 1406. The software, when executed by the processor 1404, causes the processing system 1414 to perform the various functions described supra for any particular apparatus. The computer-readable medium 1406 may also be used for storing data that is manipulated by the processor 1404 when executing software. The processing system further includes at least one of the modules 1304, 1306, 1308, 1310, and 1312. The modules may be software modules running in the processor 1404, resident/stored in the computer readable medium 1406, one or more hardware modules coupled to the processor 1404, or some combination thereof. The processing system 1414 may be a component of the eNB 610 and may include the memory 676 and/or at least one of the TX processor 616, the RX processor 670, and the controller/processor 675.

In one configuration, the apparatus 1302/1302' for wireless communication includes means for means for receiving information associated with a UE that comprises a single subscriber identifier, the UE being in communication with a first cellular network via a first cellular communication link, means for performing a pass-through function to facilitate an authentication between the UE and the first cellular network, means for establishing a second cellular communication link with the UE for communication between the UE and a second cellular network based at least on the received information, and means for maintaining the second cellular communication link while the UE is in communication with the first cellular network via the first cellular communication link. The aforementioned means may be one or more of the aforementioned modules of the apparatus 1302 and/or the processing system 1414 of the apparatus 1302' configured to perform the functions recited by the aforementioned means. As described supra, the processing system 1414 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication comprising:
   establishing a first cellular communication link, using a first instance of a radio protocol stack of a user equipment (UE), by attaching to a first cellular network managed by a mobile network operator (MNO) based on a subscriber identifier of the UE;
   establishing a second cellular communication link, using a second instance of the radio protocol stack, by attaching to a second cellular network managed by a non-MNO based on the subscriber identifier of the UE; and
   maintaining the first cellular communication link concurrently with the second cellular communication link, wherein the first cellular network continues to function as a serving public land mobile network (PLMN) of the UE after establishing of the second cellular communication link, and wherein the UE maintains a first security context for communication with the first cellular network within a subscriber identifier module (SIM) card of the UE and a second security context for communication with the second cellular network outside the SIM card of the UE.

2. The method of claim 1, wherein the first cellular network is a 3GPP Long Term Evolution (LTE) network or a Wideband Code Division Multiple Access (W-CDMA) network.

3. The method of claim 1, wherein the second cellular network is a 3GPP Long Term Evolution (LTE) network or a Wideband Code Division Multiple Access (W-CDMA) network.

4. The method of claim 1, wherein the subscriber identifier is associated with the first cellular network.

5. The method of claim 1, wherein the subscriber identifier is a 3GPP international mobile subscriber identity (IMSI) associated with the SIM card.

6. The method of claim 1, wherein establishing the first cellular communication link or the second cellular communication link comprises at least one of attaching to a 3GPP network, connecting to an Internet access point name (APN), establishing a packet data protocol (PDP) context, establishing a default bearer.

7. The method of claim 1, further comprising:
   transmitting or receiving a first Internet protocol (IP) packet to or from the first cellular network via a first IP interface; and
   transmitting or receiving a second IP packet to or from the second cellular network via a second IP interface.

8. The method of claim 7, further comprising dynamically selecting whether to use the first IP interface or the second IP interface for transmitting an IP packet.

9. The method of claim 8, wherein the dynamic selection is based on at least a characteristic associated with each of the first and second IP interfaces, a state of the first or second cellular communication link, an expected communication quality via the first or second IP interfaces, or a policy on network usage and user input.

10. The method of claim 1, wherein the first cellular network comprises a home public land mobile network and the second cellular network comprises an offload public land mobile network.

11. A method of wireless communication comprising:
    receiving information associated with a user equipment (UE) that comprises a subscriber identifier, the UE attached to a first cellular network managed by a mobile network operator (MNO) via a first cellular communication link using a first instance of a radio protocol stack of the UE;
    establishing a second cellular communication link with the UE, using a second instance of the radio protocol stack of the UE, by attaching to a second cellular network managed by a non-MNO based at least on the received information; and
    maintaining the second cellular communication link while the UE is in communication with the first cellular network via the first cellular communication link,
    wherein the information associated with the UE is received from a home subscriber server (HSS) of the first cellular network through a Wx interface, wherein the information associated with the UE is received at an offload authentication, authorization, and accounting (AAA)/ mobility management entity (MME) server, and
    wherein the first cellular network continues to function as a serving public land mobile network (PLMN) of the UE after establishing of the second cellular communication link, and wherein the UE maintains a first security context for communication with the first cellular network within a subscriber identifier module (SIM) card of the UE and a second security context for communication with the second cellular network outside the SIM card of the UE.

12. The method of claim 11, wherein the information associated with the UE comprises at least one of authentication information for the UE, authorization information for the UE, subscriber information for the UE, or accounting information for the UE.

13. The method of claim 11, wherein the information associated with the UE comprises an authentication of the UE from the first cellular network.

14. The method of claim 13, wherein the authentication of the UE is received from an authentication, authorization, and accounting (AAA) server of the first cellular network.

15. The method of claim 11, further comprising performing a pass-through function to facilitate an authentication between the UE and the first cellular network.

16. The method of claim 15, wherein the pass-through function is performed at a mobility management entity (MME).

17. The method of claim 11, wherein the first cellular network comprises a home public land mobile network and the second cellular network comprises an offload public land mobile network.

18. The method of claim 11, wherein the first cellular network is a 3GPP Long Term Evolution (LTE) network or a Wideband Code Division Multiple Access (W-CDMA) network.

19. The method of claim 11, wherein the second cellular network is a 3GPP Long Term Evolution (LTE) network or a Wideband Code Division Multiple Access (W-CDMA) network.

20. The method of claim 11, wherein the subscriber identifier is associated with the first cellular network.

21. The method of claim 11, wherein the subscriber identifier is a 3GPP international mobile subscriber identity (IMSI) associated with the SIM card.

22. An apparatus for wireless communication, comprising:
    means for establishing a first cellular communication link, using a first instance of a radio protocol stack of a user equipment (UE), by attaching to a first cellular network managed by a mobile network operator (MNO) based on a subscriber identifier of the UE;

means for establishing a second cellular communication link, using a second instance of the radio protocol stack, by attaching to a second cellular network managed by a non-MNO based on the subscriber identifier of the UE; and means for maintaining the first cellular communication link concurrently with the second cellular communication link, wherein the first cellular network continues to function as a serving public land mobile network (PLMN) of the UE after establishing of the second cellular communication link, and wherein the UE maintains a first security context for communication with the first cellular network within a subscriber identifier module (SIM) card of the UE and a second security context for communication with the second cellular network outside the SIM card of the UE.

23. The apparatus of claim 22, wherein the first cellular network is a 3GPP Long Term Evolution (LTE) network or a Wideband Code Division Multiple Access (W-CDMA) network.

24. The apparatus of claim 22, wherein the second cellular network is a 3GPP Long Term Evolution (LTE) network or a Wideband Code Division Multiple Access (W-CDMA) network.

25. The apparatus of claim 22, wherein the subscriber identifier is associated with the first cellular network.

26. The apparatus of claim 22, wherein the subscriber identifier is a 3GPP international mobile subscriber identity (IMSI) associated with the SIM card.

27. The apparatus of claim 22, wherein establishing the first cellular communication link or the second cellular communication link comprises at least one of attaching to a 3GPP network, connecting to an Internet access point name (APN), establishing a packet data protocol (PDP) context, or establishing a default bearer.

28. The apparatus of claim 22, further comprising:
means for transmitting or receiving a first Internet protocol (IP) packet to or from the first cellular network via a first IP interface; and
means for transmitting or receiving a second IP packet to or from the second cellular network via a second IP interface.

29. The apparatus of claim 28, further comprising means for dynamically selecting whether to use the first IP interface or the second IP interface for transmitting an IP packet.

30. The apparatus of claim 29, wherein the dynamic selection is based on at least a characteristic associated with each of the first and second IP interfaces, a state of the first or second cellular communication link, an expected communication quality via the first or second IP interfaces, or a policy on network usage and user input.

31. The apparatus of claim 22, wherein the first cellular network comprises a home public land mobile network and the second cellular network comprises an offload public land mobile network.

32. An apparatus for wireless communication, comprising:
means for receiving information associated with a user equipment (UE) that comprises a subscriber identifier, the UE attached to a first cellular network managed by a mobile network operator (MNO) via a first cellular communication link using a first instance of a radio protocol stack of the UE;
means for establishing a second cellular communication link with the UE, using a second instance of the radio protocol stack of the UE, by attaching to a second cellular network managed by a non-MNO based at least on the received information; and means for maintaining the second cellular communication link while the UE is in communication with the first cellular network via the first cellular communication link,
wherein the information associated with the UE is received from a home subscriber server (HSS) of the first cellular network through a Wx interface, wherein the information associated with the UE is received at an offload authentication, authorization, and accounting (AAA)/mobility management entity (MME) server, and
wherein the first cellular network continues to function as a serving public land mobile network (PLMN) of the UE after establishing of the second cellular communication link, and wherein the UE maintains a first security context for communication with the first cellular network within a subscriber identifier module (SIM) card of the UE and a second security context for communication with the second cellular network outside the SIM card of the UE.

33. The apparatus of claim 32, wherein the information associated with the UE comprises at least one of authentication information for the UE, authorization information for the UE, subscriber information for the UE, or accounting information for the UE.

34. The apparatus of claim 32, wherein the information associated with the UE comprises an authentication of the UE from the first cellular network.

35. The apparatus of claim 34, wherein the authentication of the UE is received from an authentication, authorization, and accounting (AAA) server of the first cellular network.

36. The apparatus of claim 32, further comprising means for performing a pass-through function to facilitate an authentication between the UE and the first cellular network.

37. The apparatus of claim 36, wherein the means for performing the pass-through function comprises a mobility management entity (MME).

38. The apparatus of claim 32, wherein the first cellular network comprises a home public land mobile network and the second cellular network comprises an offload public land mobile network.

39. The apparatus of claim 32, wherein the first cellular network is a 3GPP Long Term Evolution (LTE) network or a Wideband Code Division Multiple Access (W-CDMA) network.

40. The apparatus of claim 32, wherein the second cellular network is a 3GPP Long Term Evolution (LTE) network or a Wideband Code Division Multiple Access (W-CDMA) network.

41. The apparatus of claim 32, wherein the subscriber identifier is associated with the first cellular network.

42. The apparatus of claim 32, wherein the subscriber identifier is a 3GPP international mobile subscriber identity (IMSI) associated with the SIM card.

43. An apparatus for wireless communication, comprising:
a processing system configured to:
establish a first cellular communication link, using a first instance of a radio protocol stack of a user equipment (UE), by attaching to a first cellular network managed by a mobile network operator (MNO) based on a subscriber identifier of the UE;
establish a second cellular communication link, using a second instance of the radio protocol stack, by attaching to a second cellular network managed by a non-MNO based on the subscriber identifier of the UE; and
maintain the first cellular communication link concurrently with the second cellular communication link, wherein the first cellular network continues to function as a serving public land mobile network (PLMN) of the UE after establishing of the second cellular communication link, and wherein the UE maintains a first security context for communication with the first cellular network within a subscriber identifier module (SIM) card of the UE and a second security context for communication with the second cellular network outside the SIM card of the UE.

44. An apparatus for wireless communication, comprising: a processing system configured to:
receive information associated with a user equipment (UE) that comprises a subscriber identifier, attached to a first cellular network managed by a mobile network operator (MNO) via a first cellular communication link using a first instance of a radio protocol stack of the UE;
establish a second cellular communication link with the UE, using a second instance of the radio protocol stack of the UE, by attaching to a second cellular network managed by a non-MNO based at least on the received information; and
maintain the second cellular communication link while the UE is in communication with the first cellular network via the first cellular communication link,
wherein the information associated with the UE is received from a home subscriber server (HSS) of the first cellular network through a Wx interface, wherein the information associated with the UE is received at an offload authentication, authorization, and accounting (AAA)/mobility management entity (MME) server, and
wherein the first cellular network continues to function as a serving public land mobile network (PLMN) of the UE after establishing of the second cellular communication link, and wherein the UE maintains a first security context for communication with the first cellular network within a subscriber identifier module (SIM) card of the UE and a second security context for communication with the second cellular network outside the SIM card of the UE.

45. A non-transitory computer readable medium storing computer executable code for wireless communication, comprising:
code for establishing a first cellular communication link, using a first instance of a radio protocol stack of a user equipment (UE), by attaching to first cellular network managed by a mobile network operator (MNO) based on a subscriber identifier of the UE;
code for establishing a second cellular communication link, using a second instance of the radio protocol stack, by attaching to a second cellular network managed by a non-MNO based on the subscriber identifier of the UE; and
code for maintaining the first cellular communication link concurrently with the second cellular communication link, wherein the first cellular network continues to function as a serving public land mobile network (PLMN) of the UE after establishing of the second cellular communication link, and wherein the UE maintains a first security context for communication with the first cellular network within a subscriber identifier module (SIM) card of the UE and a second security context for communication with the second cellular network outside the SIM card of the UE.

46. A non-transitory computer readable medium storing computer executable code for wireless communication, comprising:
code for receiving information associated with a user equipment (UE) that comprises a subscriber identifier, the UE attached to a first cellular network via a first cellular communication link using a first instance of a radio protocol stack of the UE;
code for establishing a second cellular communication link with the UE, using a second instance of the radio protocol stack of the UE, by attaching to a second cellular network managed by a non-MNO based at least on the received information; and
code for maintaining the second cellular communication link while the UE is in communication with the first cellular network via the first cellular communication link,
wherein the information associated with the UE is received from a home subscriber server (HSS) of the first cellular network through a Wx interface, wherein the information associated with the UE is received at an offload authentication, authorization, and accounting (AAA)/mobility management entity (MME) server, and
wherein the first cellular network continues to function as a serving public land mobile network (PLMN) of the UE after establishing of the second cellular communication link, and wherein the UE maintains a first security context for communication with the first cellular network within a subscriber identifier module (SIM) card of the UE and a second security context for communication with the second cellular network outside the SIM card of the UE.

* * * * *